(12) United States Patent
Dooley et al.

(10) Patent No.: US 7,462,024 B2
(45) Date of Patent: Dec. 9, 2008

(54) APPARATUS FOR MOLDING A TRIM PANEL ASSEMBLY HAVING A NARROW TRANSITION RADIUS

(75) Inventors: David J. Dooley, Troy, MI (US); Michael P. Schoemann, Waterford, MI (US); John D. Youngs, Southgate, MI (US); Mark J. Heinze, Clarkston, MI (US); Kenneth W. Shaner, Howell, MI (US); Matthew S. Brummer, Canton, MI (US); Raymond K. Cummins, Wicom, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 862 days.

(21) Appl. No.: 10/953,662

(22) Filed: Sep. 29, 2004

(65) Prior Publication Data
US 2006/0068130 A1 Mar. 30, 2006

(51) Int. Cl.
*B29C 45/14* (2006.01)
(52) U.S. Cl. .................... 425/125; 425/129.1
(58) Field of Classification Search .......... 425/116, 425/117, 125, 126.1, 129.1; 264/328.12
See application file for complete search history.

(56) References Cited

U.S. PATENT DOCUMENTS

| 4,861,543 | A | 8/1989 | Rafferty |
| 4,978,407 | A | 12/1990 | Ardissone |
| 5,304,273 | A | 4/1994 | Kenrick et al. |
| 5,500,169 | A | 3/1996 | Kondo et al. |
| 5,573,617 | A | 11/1996 | Franck et al. |
| 5,830,518 | A | 11/1998 | Oda |
| 5,938,887 | A | 8/1999 | Reynolds et al. |
| 6,054,087 | A * | 4/2000 | Noirot et al. ............ 264/251 |
| 6,261,504 | B1 | 7/2001 | Baker et al. |
| 6,524,506 | B2 | 2/2003 | Spengler |
| 6,524,510 | B2 | 2/2003 | Spengler |

FOREIGN PATENT DOCUMENTS

| DE | 199 58 316 C1 | 2/2001 |
| DE | 696 21 948 T2 | 10/2002 |
| JP | 2004 17627 A | 1/2004 |

\* cited by examiner

*Primary Examiner*—Robert B Davis
(74) *Attorney, Agent, or Firm*—Brooks Kushman P.C.

(57) ABSTRACT

In at least certain embodiments, the present invention relates to a trim panel and an apparatus and method of making the same. In at least one embodiment, the trim panel comprises a first portion and a second portion with a transition portion extending therebetween with the first portion and the second portion having curved portions having radii of less than 5 mm.

14 Claims, 3 Drawing Sheets

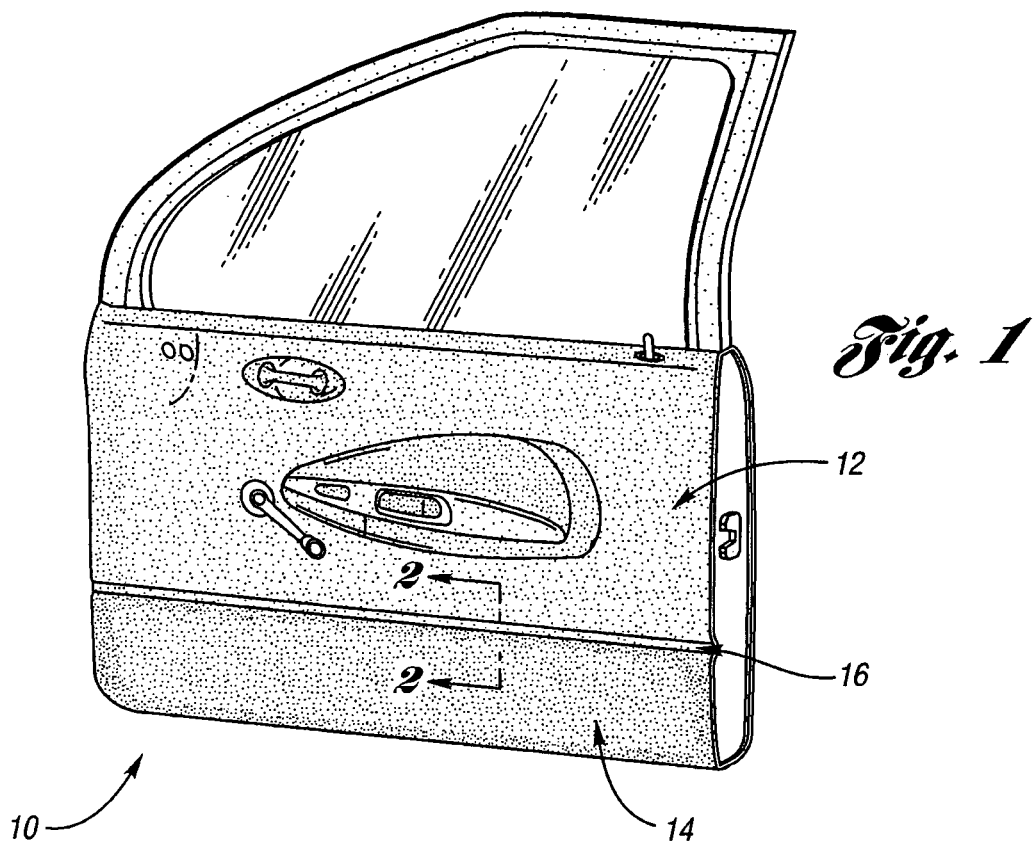
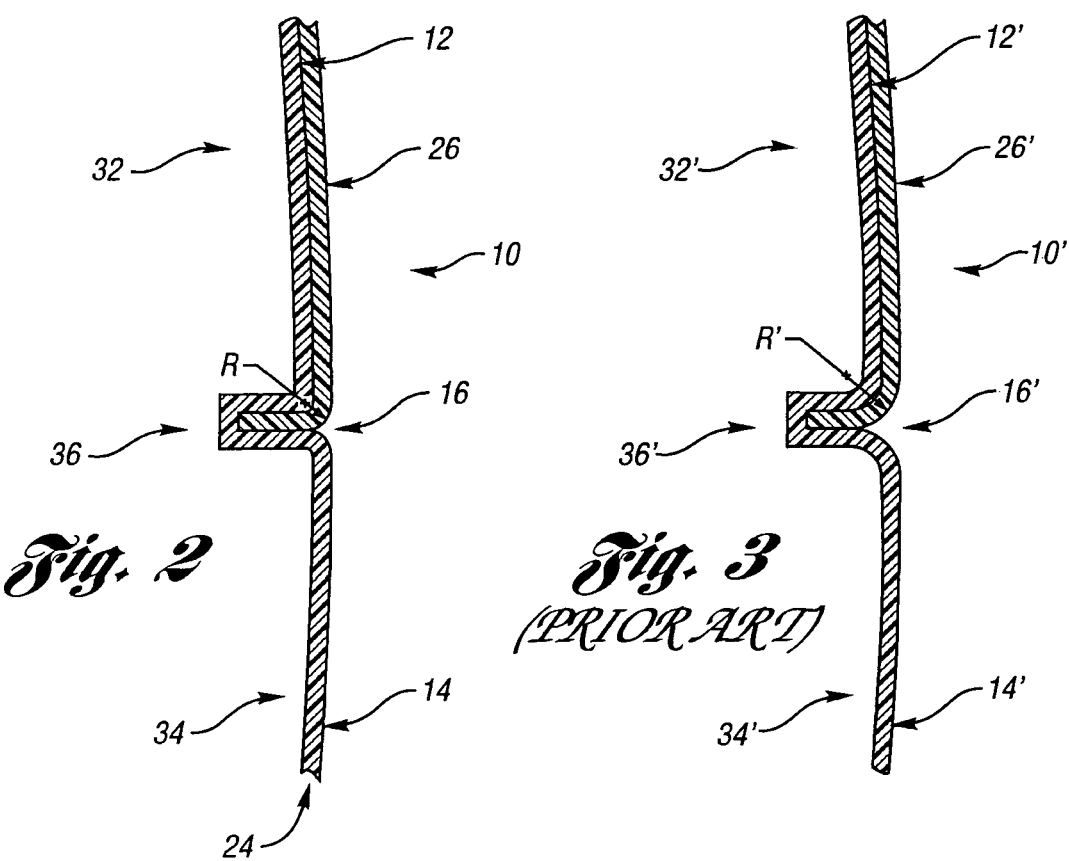

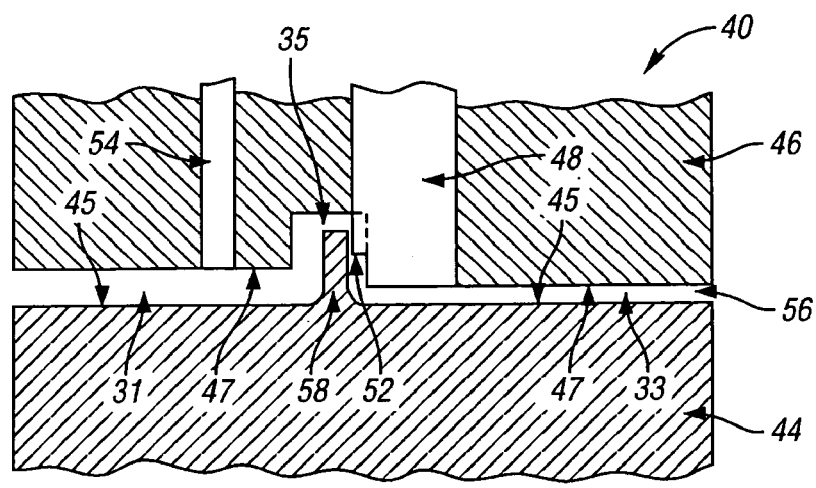
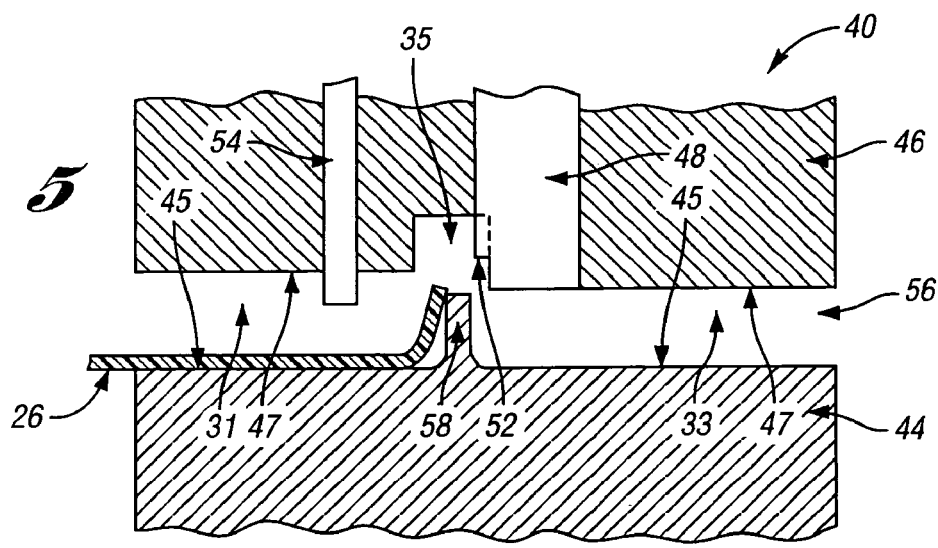
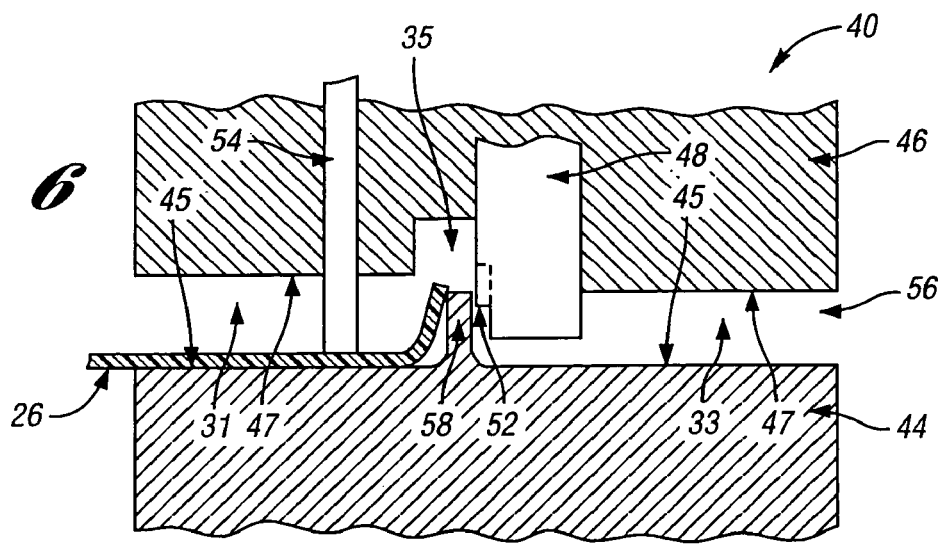

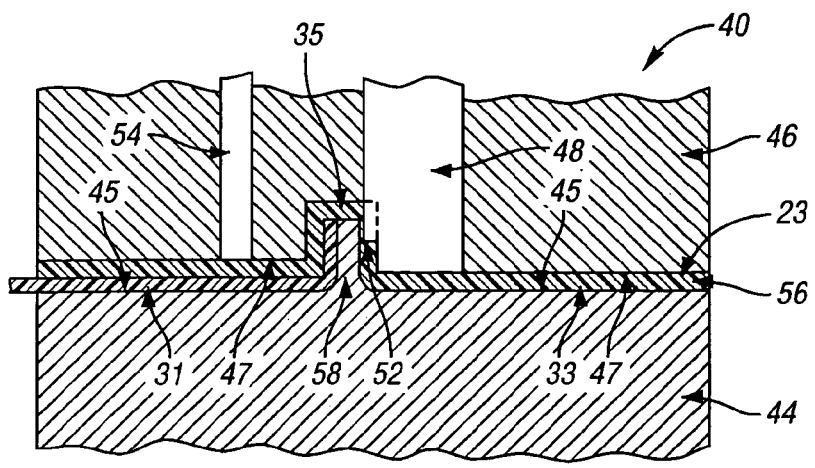
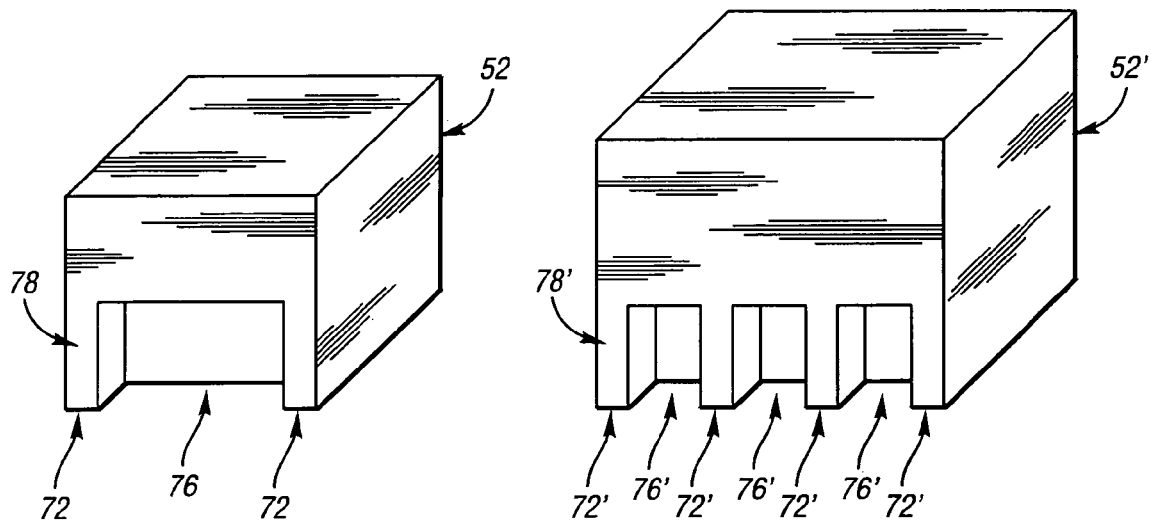
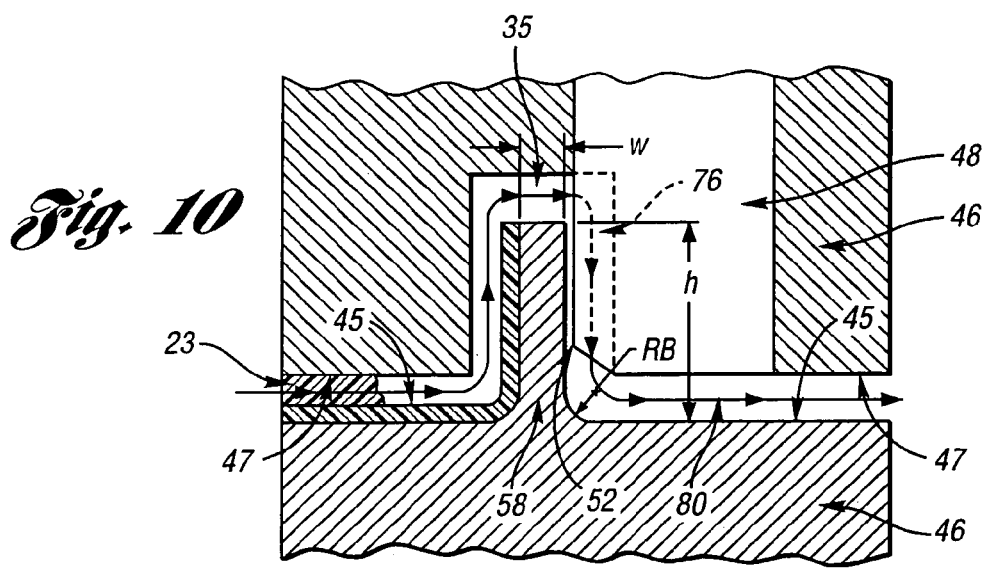

APPARATUS FOR MOLDING A TRIM PANEL ASSEMBLY HAVING A NARROW TRANSITION RADIUS

BACKGROUND OF THE INVENTION

1. Field of the Invention

The present invention relates to a trim panel assembly having a narrow transition radius and an apparatus and method of manufacturing the same.

2. Background Art

Vehicle trim panels such as instrument panels and door panels are sometimes partially covered by a coverskin. In this type of configuration, it can be considered desirable to hide the end of the coverskin at the transition between the covered and uncovered portion of the panel. One technique for achieving this is through the use of a tuck rib in a mold. The skin is laid on the mold on one side of the rib. Resin is then introduced into the mold, keeping the skin pressed against the mold. This results in a groove along the panel, giving the appearance that the coverskin is tucked under and hidden behind the groove.

There is concern, however, that pressure caused by injecting the resin into mold will cause the rib to fail. To prevent this, the ribs have been designed to be relatively thick, with a relatively large radius at its base. However, the larger the radius of the rib, the larger the radii at the groove on the visible surface of the finished panel tends to be. A relatively large radius on the surface can result in a relatively large gap between the covered and uncovered portion. A relatively large gap can be considered undesirable by some.

It would be desirable to provide a trim panel assembly having a narrow transition radius. It would also be desirable to provide an apparatus and method of manufacturing the same.

SUMMARY OF THE INVENTION

According to one aspect of the invention, the present invention relates to a trim panel. In at least one embodiment, the trim panel comprises a first portion, a second portion and a transition portion extending between the first and second portions. The first portion includes a cover material over at least a portion of the first portion, with the second portion being at least partially uncovered. The first portion has a first upper surface and the second portion has a second upper surface spaced apart from the first upper surface. The first portion has a first curved portion having a first radius and the second portion having a second curved portion having a second radius. In at least one embodiment, the first and second radii are each less than 5 mm, and the first and second curved portions have a void therebetween with the cover material contacting the uncovered second portion.

In at least another embodiment, the first and second radii are each between 1.0 and 4.0 mm.

Another aspect of the invention relates to an apparatus for molding a trim panel. In at least one embodiment, the apparatus comprises a first mold half having a first molding surface with a projecting member projecting away from the first molding surface. The apparatus may also comprise a second mold half having a second molding surface. The mold halves may be capable of relative movement between a first and second position. When the mold halves are in the second position, the first and second molding surfaces may help to define a mold cavity. In at least one embodiment, the apparatus may also comprise a support member that is capable of supporting the projecting member of the first mold half when the mold halves are in the second position. The support member may be able to allow fluid to pass through.

In at least one embodiment, the support member is part of the second mold half.

In at least another embodiment, the support member may be capable of moving relative to the first and second mold halves between a first and second position, and is able to support the projecting member of the first mold half when in the second position.

In at least another embodiment, the support member comprises at least one channel that allows fluid to pass through.

In at least another embodiment, the support member may be disposed laterally of the projecting member.

Another aspect of the invention relates to the method of making a trim panel. In at least one embodiment, the method may comprise providing a mold comprising a first and second mold half. The first and second mold halves have respective first and second molding surfaces. The first molding surface has a projecting member projecting away from the first molding surface. The first and second mold halves are capable of relative movement between a first and a second position with the first and second molding surfaces helping to define a mold cavity when the mold halves are in the second position. The apparatus may also comprise a support member capable of supporting the projecting member when the mold halves are in the second position. The method may comprise moving the mold halves from the first to the second position, introducing substrate resin into the mold cavity, allowing the resin to cure to form the panel, and removing the panel from the mold.

In at least another embodiment, the method is suitable for making a partially covered panel. In this embodiment, prior to moving the mold halves to the second position, a coverskin may be provided on the first molding surface.

BRIEF DESCRIPTION OF THE DRAWINGS

FIG. 1 illustrates a perspective view of one embodiment of a trim panel for a motor vehicle in accordance with the present invention;

FIG. 2 illustrates a cross-section view along line 2-2 of FIG. 1;

FIG. 3 is a view similar to FIG. 2 showing a panel in the prior art;

FIG. 4 illustrates one embodiment of a mold suitable for making the panel shown in FIGS. 1 and 2;

FIG. 5 shows one embodiment of the mold in an open position;

FIG. 6 shows one embodiment of the mold in an intermediate position;

FIG. 7 shows one embodiment of the mold at nearly full close;

FIG. 8 shows one embodiment of the support member having one channel;

FIG. 9 shows yet another embodiment of the support member having multiple channels; and FIG. 10 shows an enlargement of one embodiment of the transition region of the mold.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various alternative forms. The figures are not necessarily to scale, some features may be exaggerated or minimized to show details of particular components. Therefore, specific structural or functional details disclosed herein are not to be interpreted as limiting, but merely as a representative basis for the claims and/or a representative basis for teaching one skilled in the art to variously employ the present invention.

Moreover, except for otherwise expressly indicated, all numeral quantities in this description and in the claims indicating amounts or conditions are to be understood as modified by the word "about" in describing the broader scope of the invention. Practice within the numerical range as stated is generally preferred. Also, unless expressly stated to the contrary, percents, "parts of," and ratio values are by weight and the description of a group or class of materials as suitable or preferred for a given purpose in connection with the invention implies that mixtures of any two or more members of the group or class may be equally suitable and preferred.

Referring to FIG. 1, there is illustrated a vehicle trim panel 10, such as a motor vehicle door panel. While the trim panel 10 is being illustrated as a door panel, it should be understood that the panel could be other types of panels, such as an instrument panel, and other vehicle interior trim panels.

FIG. 2 shows a cross-section of trim panel 10 across line 2-2. The panel 10 may generally comprise a substrate 24 having a first region 32 and a second region 34 with a transition region 36 disposed therebetween. In at least one embodiment, the first region 32 includes a first surface 12 covered by a coverskin 26. In at least one embodiment, the second region 34 includes a second surface 14 that is uncovered. In at least one embodiment, in the transition region 36, on the visible surface of the panel 10, there is a visible gap 16 between the first and second regions 32 and 34. In at least one embodiment, the visible gap 16 is formed by the contacting of the coverskin 26 with the substrate 24 of the second region 34. In at least one embodiment, the visible gap 16, and the visible surface of both regions 32 and 34 have an outer radius R of less than 5.0 mm, in another embodiment between 1.0 mm and 4.0 mm, and in yet another embodiment between 2.0 mm and 3.0 mm. In at least one embodiment, the minimum distance between the upper surface of the first region 32 and the upper surface of the second region 34 is between 2.0 mm and 10 mm, and in another embodiment, between 4.0 mm and 6.0 mm.

FIG. 3 shows an example of the radius achieved in a prior art door panel 10'. This view is similar to FIG. 2 in that it shows a cross-section of a panel with a first region 32', second region 34', and a transition region 36' disposed therebetween. The first region 32' has a first surface 12' covered by a coverskin 26'. The second region 34' has a second surface 14' that is uncovered. Within the transition region 36' is a visible gap 16' which is larger relative to the gap 16 shown in FIG. 2. This larger gap 16' may result from an outer radii R' on the visible surface of the part of between 7 mm and 10 mm. As such, the minimum distance between the upper surface of the first region 32' and the upper surface of the second region 34' is between 14 mm and 20 mm.

Another aspect of the invention is the apparatus for making a panel such as panel 10. Although FIGS. 4-9 illustrate a molding apparatus for molding door panel 10, it should be understood that the mold could be used for other types of trim panels.

Referring now to FIG. 4, there is illustrated a mold 40 which may be suitable for either injection molding or injection compression molding. In at least one embodiment, the mold 40 comprises a first mold half 44 with a first molding surface 45 and a second mold half 46 having a second molding surface 47. The first molding surface 45, in at least one embodiment, includes a projecting member 58 projecting away from the first molding surface 45 towards the second molding surface 47. The mold halves 44 and 46 are capable of relative movement between at least a first and a second position. The mold 40 also comprises a support member 52 that, in at least one embodiment, has at least a portion that abuts the projecting member 58 when the mold halves 44 and 46 are in the second position. In at least one embodiment, the support member 52 may be capable of supporting the projecting member 58 of forces perpendicular to the direction of projection between 50 psi and 6000 psi.

According to at least one embodiment, the projecting member 58, which can also be referred to as a tuck rib, is between 6.0 mm and 25 mm tall h, and in another embodiment, between 12 mm and 18 mm tall h, by between 0.5 mm and 3.0 mm wide w, and in another embodiment between 1.0 mm and 2.0 mm wide w. Additionally, to achieve the desired radius on the visible surface of the finished part, the radius RB at the base of the projecting member 58 in at least one embodiment, is less than 5.0 mm, in another embodiment between 0.1 mm and 2.5 mm, and in yet another embodiment between 1.0 mm and 1.7 mm.

While the mold halves 44, 46 are in the second position, the void between the first and second molding surfaces 45 and 47 help to define a cavity 56 within the mold 40. This mold cavity 56 may have first region 31, second region 33 and transition region 35, which may essentially correspond to regions 32, 34 and 36, respectively, of panel 10 shown in FIG. 2. The area of the mold 40 surrounding the transition region 35 is magnified in FIG. 10.

In at least one embodiment, the support member 52 may be connected to a lifter 48 capable of relative movement between at least a first and second position relative to the mold halves 44 and 46. When the lifter 48 is in second position, the support member 52 abuts the projecting member. In at least another embodiment, the support member 52 and lifter 48 may be a single unit (i.e., integral), while in other embodiments they may be capable of separation.

In yet another preferred embodiment, the mold may also comprise a positioning member 54 which is capable of relative movement between at least a first and a second position relative to mold halves 44 and 46. In at least one embodiment, the positioning member 54 operates to align a coverstock, such as 26, on the first molding surface 45 in the first region 31 before the mold halves 44 and 46 and the support lifter 48 reach the second position.

Referring to FIG. 8, one embodiment of the support member 52 is illustrated. In this embodiment, the support member contains two support blades 72 (i.e., projections) spaced apart and a single channel 76 disposed therebetween. Each of the support blades 72 have a surface 78 that, in at least one embodiment, contacts and abuts portions of the projecting member 58 when the mold halves 44 and 46 are in the second position. If the lifter 48 is used, the surface 78 can abut the projecting member when the lifter is in the second position. During an injection or injection compression molding process, resin 23 injected into the mold cavity 56 may flow in an upward direction to overcome the projecting member 58, and then horizontally across the projecting member 58, and then into channel 76 of support member 52 and downward toward the second mold region 33 as shown by path 80 in FIG. 10.

Referring to FIG. 9, another embodiment of lifter 52' is disclosed. In this embodiment, lifter 52' discloses multiple blades 72' and multiple channels 76'. In at least one embodiment, the surfaces 78' of the blades 72' can abut portions of the projecting member 58 when the mold halves 44, 46 and/or the lifter 48 are in the second position. In this embodiment, resin 23 would flow into the channels 76' similarly to how they would flow into channel 76 illustrated in FIG. 10.

In at least one embodiment, the blades 72 or 72' and the projecting member 58 may have a draft angle of 0°-7°.

Referring to FIGS. 5-7 and 10, at least one embodiment of a method of operating the apparatus is shown. A coverskin 26 may be provided on the first molding surface 45 in the first region 31. Next, in at least one embodiment, the positioning member 54 and the support lifter 48 can then be moved from the first to the second position thereby enabling support member 52 to support the projecting member 58, which is shown in FIG. 6. Next, in at least one embodiment, the mold halves 44 and 46 can be moved from the first to the second position. However, before the mold halves 44, 46 fully reach the second position, substrate resin 23 could be introduced into the cavity 56 as is demonstrated in FIG. 7. Once the resin 23 has been introduced, the mold halves 44 and 46 can be closed further to the second position. As best shown in FIG. 10, resin 23 injected into the mold cavity 56 may flow in an upward direction to overcome the projecting member 58, and then horizontally across the projecting member 58, and then into channel 76 (or channels 76') of support member 52 (or 52') and downward toward the second mold region 33 as shown by path 80. Then, the resin 23 would be allowed to harden. Once the resin 23 has cured into substrate 24, mold halves 44 and 46, the positioning member 54, and the support lifter 48 would move back to the first position in any desirable order. The finished part (such as 10) could then be ejected or removed by any suitable method.

In at least one embodiment, a pressure may exist in the cavity 56 due to presence of the resin 23. The pressure may be between 50 psi and 6000 psi.

In at least another embodiment, the mold may be used without positioning member 54 and/or support lifter 48. In this embodiment, it may be sufficient to move the mold halves 44 and 46 into the second position such that support member 52 is adjacent the projecting member. According to at least one embodiment, this is achieved when the support member 52 is a part of at least one of the two mold halves. The resin 23 could then be introduced, with the mold halves completely in the second position, into the mold cavity 56. Once the resin 23 cures into substrate 24, the mold halves 44 and 46 could be moved back into the first position and the finished part could be ejected or removed by any suitable method.

If it is desired to use positioning member 54 and support lifter 48, in at least one embodiment, they may be controlled to move simultaneously.

In yet another embodiment, members 54, 48 and mold halves 44 and 46 may be moved in conjunction to the first position once the part is finished. However, the first and second positions of the mold halves 44 and 46 and the first and second positions of the members 54 and 58 may be spaced such that positioning member 54 and support lifter 48 are used to eject the finished part from the second surface of the mold.

While the embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for molding a part, said apparatus comprising:
    a first mold half having a first molding surface, the first molding surface having a projecting member projecting away from the first mold half;
    a second mold half having a second molding surface, the mold halves being capable of relative movement between a first position and a second position;
    the first and second molding surfaces helping to define a mold cavity when the mold halves are in the second position; and
    a support member that is capable of supporting the projecting member of the first mold half when the mold halves are in the second position, the support member being able to allow fluid to pass through the support member.

2. The apparatus of claim 1 wherein the support member has at least one channel that allows fluid to pass through the support member.

3. The apparatus of claim 2 wherein the support member includes a plurality of channels that allow fluid to pass through the support member.

4. The apparatus of claim 2 wherein the at least one channel has a first portion extending in a first, generally horizontal, direction, and a second portion extending in a second, generally vertical, direction.

5. The apparatus of claim 4 wherein the support member is integral with the second mold half.

6. The apparatus of claim 4 wherein the support member is capable of moving relative to the first mold half and the second mold half between a first support member position, and a second support member position and the support member is able to support the projecting member of the first mold half when the support member is in the second support member position.

7. The apparatus of claim 2 wherein
    the second mold half has a positioning member for aligning a coverstock on the first mold half, the positioning member being capable of moving relative to the first mold half and the second mold half between a first positioning member position and a second positioning member position; and
    the positioning member being able to align the coverstock on the first mold half when the positioning member is in the second positioning member position.

8. The apparatus of claim 1 wherein the support member is capable of supporting the projecting member against a force perpendicular to the direction of projection.

9. The apparatus of claim 8 wherein the force is between 50 psi and 6000 psi.

10. The apparatus of claim 6 wherein the support member is adjacent the projecting member when the support member is in the second support member position.

11. The apparatus of claim 10 wherein the support member contacts the projecting member when the support member is in the second support member position.

12. The apparatus of claim 5 wherein the apparatus is suitable for molding a substrate partially covered by coverstock, wherein
    the mold cavity further comprises a first region, a second region and a transition region;
    the first region being covered by the coverstock;
    the second region being uncovered by the coverstock;
    the projecting member being disposed between the first and second regions within the transition region;
    the projecting member having a projecting member surface;
    the first molding surface and the second molding surface helping to define the mold cavity in the first region when the mold halves are in the second position;
    the support member having a third molding surface;
    the first molding surface, second molding surface, and the third molding surface helping to define the mold cavity in the second region when the mold halves and the support member are in the respective second positions; and
    the projecting member surface, second molding surface and third molding surface helping to define the mold cavity in the transition region when the mold halves and the support and the support member are in the respective second positions.

13. The apparatus of claim 12 wherein when the mold halves are in the second position, the first region of the mold cavity, the transition region of the mold cavity, the at least one channel of the support member, and the second region of the mold cavity are in fluid communication.

14. The apparatus of claim 1 wherein the projecting member has a base portion having a radius of between 0.1 mm and 5 mm.

* * * * *

UNITED STATES PATENT AND TRADEMARK OFFICE
CERTIFICATE OF CORRECTION

| | | |
|---|---|---|
| PATENT NO. | : 7,462,024 B2 | Page 1 of 1 |
| APPLICATION NO. | : 10/953662 | |
| DATED | : December 9, 2008 | |
| INVENTOR(S) | : David J. Dooley et al. | |

It is certified that error appears in the above-identified patent and that said Letters Patent is hereby corrected as shown below:

Title Page, Item (75) Inventors:

After "Raymond K. Cummins"

Delete "Wicom" and insert -- Wixom --.

Signed and Sealed this

Seventeenth Day of March, 2009

JOHN DOLL
*Acting Director of the United States Patent and Trademark Office*